United States Patent
Meise et al.

(10) Patent No.: US 7,381,144 B2
(45) Date of Patent: Jun. 3, 2008

(54) GEARBOX ASSEMBLY WITH GEARBOX MEANS FOR SPEED OVERLAP

(75) Inventors: Andreas Meise, Bochum (DE); Bernhard Langenbeck, Dortmund (DE); Steffan Reiblein, Hambrücken (DE); Frank Nagel, Ulm (DE)

(73) Assignee: Lohmann & Stolterfoht GmbH (DE)

( * ) Notice: Subject to any disclaimer, the term of this patent is extended or adjusted under 35 U.S.C. 154(b) by 101 days.

(21) Appl. No.: 11/261,888

(22) Filed: Oct. 28, 2005

(65) Prior Publication Data

US 2006/0094553 A1    May 4, 2006

(30) Foreign Application Priority Data

Nov. 4, 2004   (DE) ............ 10 2004 053 254

(51) Int. Cl.
*F16H 47/04* (2006.01)
(52) U.S. Cl. ............ 475/72; 475/78; 475/207; 475/218; 475/219
(58) Field of Classification Search ........... 475/73, 475/78, 82
See application file for complete search history.

(56) References Cited

U.S. PATENT DOCUMENTS

| | | | |
|---|---|---|---|
| 3,306,129 A | | 2/1967 | DeLiao |
| 3,396,607 A | | 8/1968 | Williams |
| 3,714,845 A | * | 2/1973 | Mooney, Jr. ............ 475/81 |
| 3,733,931 A | | 5/1973 | Becker et al. |
| 3,803,843 A | | 4/1974 | Nyman et al. |
| 3,903,755 A | * | 9/1975 | Polak ............ 475/82 |
| 3,903,756 A | * | 9/1975 | Hamma ............ 475/76 |
| 3,979,972 A | * | 9/1976 | Sakai et al. ............ 475/81 |
| 5,667,452 A | | 9/1997 | Coutant |
| 5,868,640 A | * | 2/1999 | Coutant ............ 475/72 |
| 6,565,471 B2 | * | 5/2003 | Weeramantry et al. ....... 475/80 |
| 6,595,885 B1 | | 7/2003 | Lutgen |

FOREIGN PATENT DOCUMENTS

| | | | |
|---|---|---|---|
| DE | 11940386 | | 4/1971 |
| EP | 911546 B1 | | 4/1999 |
| EP | 1195542 A1 | | 4/2002 |
| EP | 1273828 A2 | | 1/2003 |
| GB | 1259290 A | | 4/1918 |
| JP | 05215200 A | * | 8/1993 |
| JP | 05215200 A | | 8/1993 |

* cited by examiner

*Primary Examiner*—David D. Le
(74) *Attorney, Agent, or Firm*—Jack Schwartz & Associates, PLLC

(57) ABSTRACT

A gearbox assembly, in particular for a wheel drive of a vehicle with a hydrostatic gearbox having, according to a first driving mode, the sun gear of the single planetary stage in effective interaction with a ring gear of the planetary stage via a first coupling, so that the output speed of the planetary stage is a linear function of the output speed of the hydrostatic gearbox and that, according to a second driving mode, the ring gear is in effective interaction with the hydrostatic gearbox, wherein, at the same time, the sun gear is in effective interaction with a gearbox input shaft via a second coupling so that as a consequence of power distribution, the speeds of the ring gear and the sun gear overlap.

9 Claims, 2 Drawing Sheets

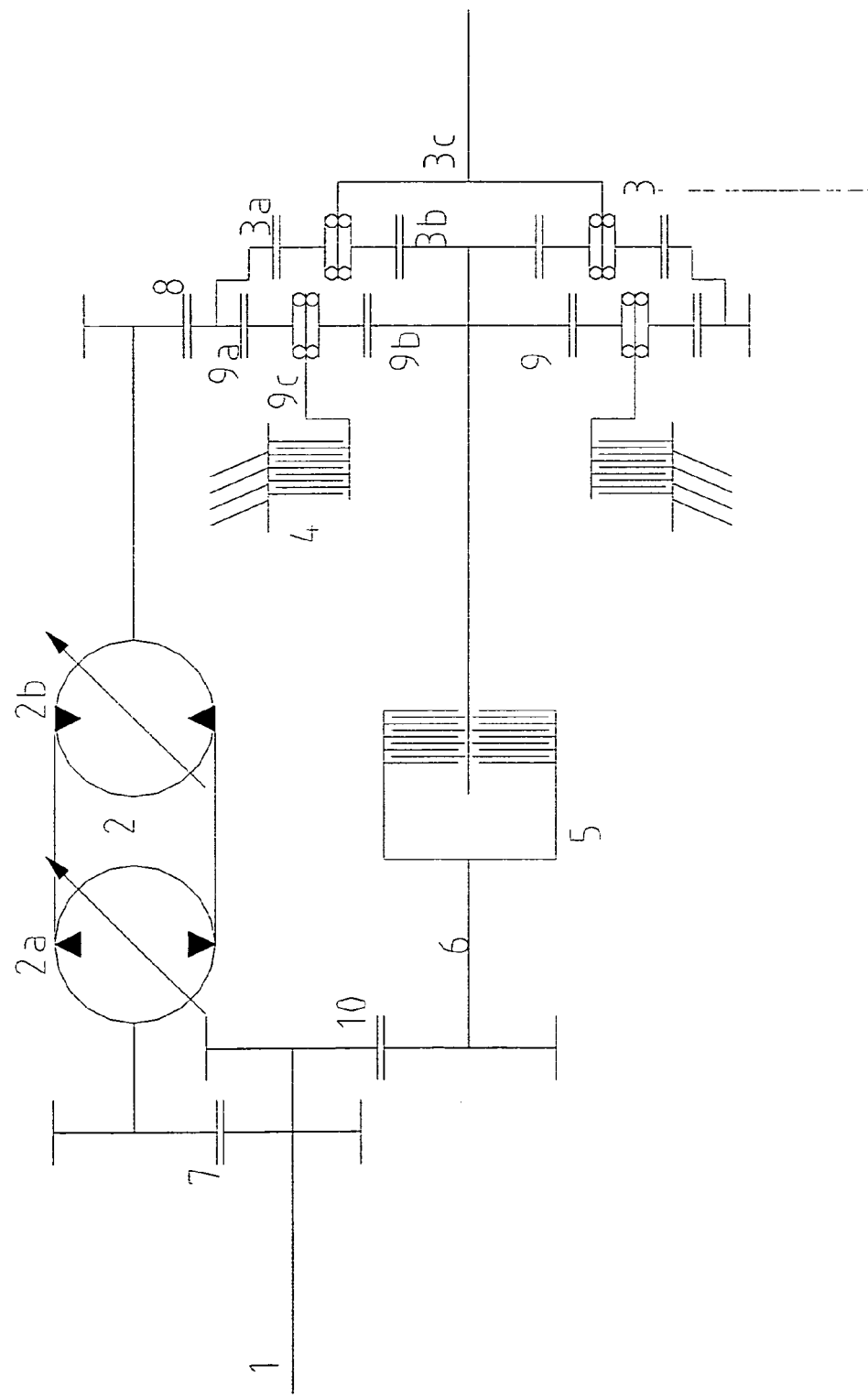

GEARBOX ASSEMBLY WITH GEARBOX MEANS FOR SPEED OVERLAP

FIELD OF THE INVENTION

The present invention relates to a gearbox assembly, in particular for a drive of a vehicle, with a hydrostatic gearbox having at least one downstream planetary stage, wherein the planetary stage is coupled to the hydrostatic gearbox via intermediate gearbox means for speed overlap within the planetary stage.

The field of use of such gearbox assemblies is mainly in vehicles, in particular earth moving vehicles and the like. The specific gearbox assembly serves as a continually variable gearbox for driving such vehicles.

BACKGROUND OF THE INVENTION

From the general state of the art, generic gearbox assemblies are known, in which the mechanical power transmission is combined with an infinitely variable hydrostatic gearbox. The purpose of this gearbox assembly is to enlarge the range of transmission of a hydrostatic drive and to make gear switching possible without interrupting the drive power. Typically a hydrostatic gearbox consisting of a hydraulic pump with variable speed and a downstream hydraulic motor, outputs a continually variable output speed to the wheels or tracks of the vehicle. In particular, the speed can be continually varied by controlling the pumping capacity of the variable hydraulic pump. In order to also cover an additional driving mode, the motor torque is divided between the hydrostatic gearbox and a mechanical gearbox coupled with it. The mechanical gearbox in the form of at least one planetary gear stage has a number of gearbox ranges corresponding to the various operating speeds of the wheel drive. The combination of the hydrostatic gearbox and the mechanical gearbox makes it possible to provide a continually variable gearbox which works over a wider range of speeds than would be possible with the use of the hydrostatic gearbox alone.

DE 101 44943 A1 discloses such a gearbox assembly. The gearbox assembly comprises a hydrostatic gearbox coupled with a mechanical gearbox so that first and second driving modes can be selected. A control apparatus carries out a switching operation from the first gearbox range provided for it to the second gearbox range. This state of the art solves the problem of not converting in a power-distributed way the whole of the drive power in the driving mode around the stationary position of the vehicle, so that the vehicle can be reversed in a purely hydrostatic way without having to switch a coupling in the stationary position, and that in this driving mode, which typically is the main working range for the vehicles, there is no reactive power present in the hydraulic cycle. The couplings should only be switched when the driving mode is changed and with the speed of the parts to be coupled being equal.

A drawback with this prior art is that the above result is only implemented with a great deal of structural complexity. A great number of individual couplings are necessary within the gearbox which must be driven in a coordinated way by a central electronic control apparatus.

SUMMARY OF THE INVENTION

It is thus an object of the present invention to improve further upon a gearbox assembly of the above-mentioned type in such a way that a wide range of driving modes of the gearbox assemblies is possible while using minimal structural complexity.

The object is achieved on the basis of a gearbox assembly according to the preamble of claim 1 in combination with its characterizing features. The subsequent dependent claims refer to advantageous embodiments of the present invention. In particular, a gearbox assembly according to the present invention is for a wheel drive.

The invention comprises the technical teaching that according to a first driving mode, the sun wheel of the single planetary stage is in effective interaction with a ring gear of the planetary stage so that the drive speed of the planetary stage is a linear function of the drive speed of the hydrostatic gearbox and that further, according to a second driving mode, the ring gear is in effective interaction with the hydrostatic gearbox, while at the same time the sun wheel is in effective interaction with a gearbox drive shaft via a second coupling, so that the speeds of the ring gear and the sun wheel overlap and that the first coupling is in effective interaction with the ring gear of the planetary stage via a gearbox stage, and that the ring gear is in effective interaction with the hydrostatic gearbox via a gearbox stage, wherein at least one gearbox stage has a spur gear fixedly mounted on a shaft and the shaft is driven by the hydrostatic gearbox in order to couple the ring gear and the sun gear of the planetary stage with each other in the first driving mode.

The advantage of the gearbox assembly according to the present invention is in particular that a high transmission ratio is possible by changing the operating mode via two couplings whereby, for forward driving of a vehicle, two driving modes are provided complementing each other. By providing an additional coupling, two driving modes can also be provided for backward driving of the vehicle. The relatively small amount and cost of mechanical components results from the fact that only one planetary stage is used as an overlapping stage. In the first driving mode, the ring gear and the sun gear of the planetary stage are coupled with each other via the coupling. Thus the driving force is transmitted from the gearbox input shaft, via the hydrostatic gearbox in the planetary stage, the planetary pinion of which is the output shaft. In the second driving mode, the driving force is transmitted in a power distributed way on the one hand directly in a mechanical manner via the second coupling to the sun gear of the planetary stage and on the other hand via the hydrostatic gearbox to the ring gear of the planetary stage. Power is, again, output via the planetary pinion. The first coupling is opened in this case.

Preferably, it is provided that the two gearbox stages each have a spur gear fixedly mounted on a common shaft and that the shaft is driven by the hydrostatic gearbox. This results in a particularly economical structure with respect to the number of components needed.

As an alternative, the gearbox stage alone can have a spur wheel fixedly mounted on a shaft, and the shaft can be driven by the hydrostatic gearbox, wherein said spur gear meshes with an externally geared ring gear of the downstream gearbox stage. This embodiment achieves an even more compact structure since the power need not be transmitted via an extra spur wheel stage but via parallel power transmission paths provided by the number of planetary gears.

Advantageously, switching between the first driving mode and the second driving mode is carried out by alternately operating the two couplings via a central control unit which simultaneously drives the hydrostatic gearbox in accordance with the driver's wish.

The gearbox assembly according to the present invention can have various gearbox stages for the purpose of speed adjustment. This is why the gearbox input shaft drives the hydrostatic gearbox preferably via an intermediate gearbox stage. The first coupling can also be in effective interaction with the ring gear of the planetary stage via another gearbox stage, i.e. in an indirect way. It may also be advantageous, however, to have the ring gear in effective interaction with the hydrostatic gearbox via an intermediate gearbox stage.

According to another advantageous embodiment of the present invention it is provided that at least one additional coupling is arranged between the gearbox input shaft and the sun gear of the planetary stage in order to provide at least one second driving mode also for backward driving. Preferably, this additional coupling is also in effective interaction with the gearbox input shaft via an associated gearbox stage comprising a reversing gear.

Further advantageous embodiments of the invention will be described in more detail in the following in a description of a preferred exemplary embodiment of the present invention with reference to the accompanying drawings, in which:

BRIEF DESCRIPTION OF THE DRAWINGS

FIG. 3 is a schematic diagram of a third embodiment of a gearbox assembly with gearbox means for speed overlap.

DETAILED DESCRIPTION OF THE INVENTION

Figure 1:
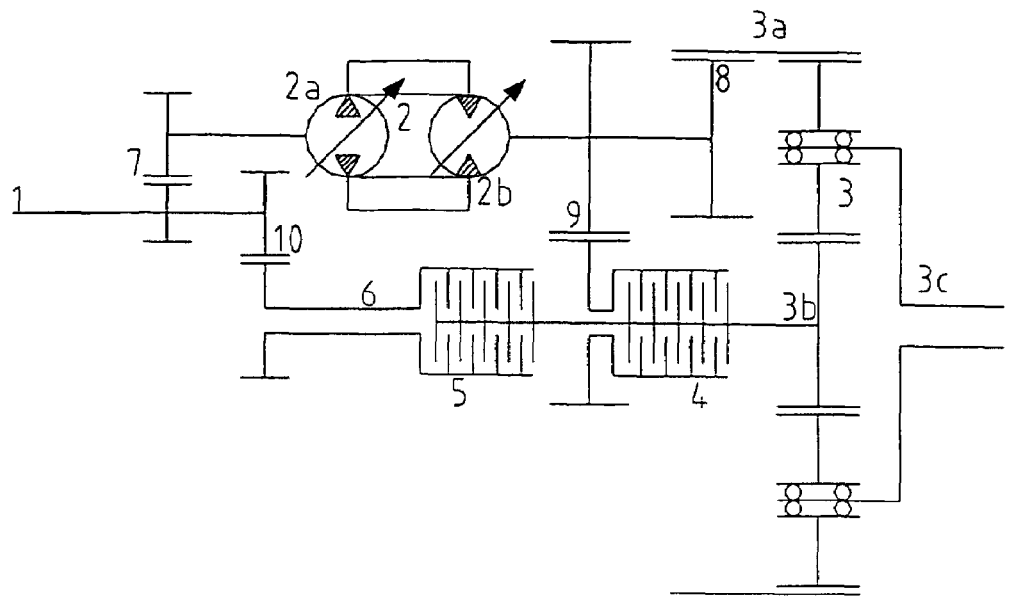
FIG. 1 is a schematic diagram of a first embodiment of a gearbox assembly with gearbox means for speed overlap.

With reference to FIG. 1, following the power transmission path, the gearbox assembly comprises a gearbox input shaft 1 driven by a motor (not shown). A hydrostatic gearbox 2 is downstream of the gearbox input shaft 1. The hydrostatic gearbox 2 comprises a variable hydraulic pump 2a hydrostatically coupled with a variable hydraulic motor 2b. A planetary stage 3 is coupled downstream of the hydrostatic gearbox 2. Two series-connected couplings 4 and 5 are provided along a parallel power transmission path extending from the gearbox input shaft 1 via a gearbox stage 10 and an output shaft 6. The coupling 4 at the end is connected with the sun gear 3b of the planetary stage 3. The planetary pinion (pinion cage) 3c of the planetary stage 3 is the power output of the gearbox assembly.

In a first driving mode, the power transmission extends from the gearbox input shaft 1 via an input gearbox stage 7 to the drive shaft of the variable pump 2a of the hydrostatic gearbox 2. The output shaft of the hydrostatic motor 2b of the hydrostatic gearbox 2, via downstream gearbox stages 8 and 9, is in effective interaction with the ring gear 3a of the planetary stage 3, and also with the coupling 4 of the parallel power transmission. By closing the coupling'4 in the first driving mode, the ring gear 3a and the sun gear 3b of the planetary stage 3 are additionally connected via the gearbox stages 8 and 9, which reduces the number of degrees of freedom of the planetary stage 3 so that the output speed of the planetary pinion 3c is a direct function of the output speed of the hydraulic motor 2b.

At a constant output speed, if the variable hydraulic pump 2a is adjusted from the neutral position to a larger pumped volume, the speed of the hydraulic motor 2b is increased as a function of the increasing pumped volume, which in turn increases the output speed of the hydrostatic gearbox 2. Adjusting the variable pump 2a in the opposite direction results in the hydraulic motor 2b rotating in the opposite sense and therefore in the vehicle driving backwards.

The transmission ratios of gearbox stages 7 to 10 and the planetary stage 3 are adapted to each other in such a way that at the maximum speed of the variable hydraulic motor 2b, the sun gear 3b and the shaft 6 of the parallel power transmission path have the same speed of rotation. At this point of operation, the first coupling 4 is opened and the second coupling 5 closed by means of a control unit (not shown). As a consequence, the sun gear 3b of the planetary stage 3 rotates at constant speed in the same sense as the planetary pinion 3c while the ring gear 3a rotates at maximum speed in the opposite sense. If by changing the transmission ratio of the hydrostatic gearbox 2 by corresponding control of the control unit, the ring gear 3a is first retarded and then accelerated in the opposite sense, there is a further acceleration of the planetary pinion 3c resulting from a speed overlap, which corresponds to the second driving mode.

Figure 2:
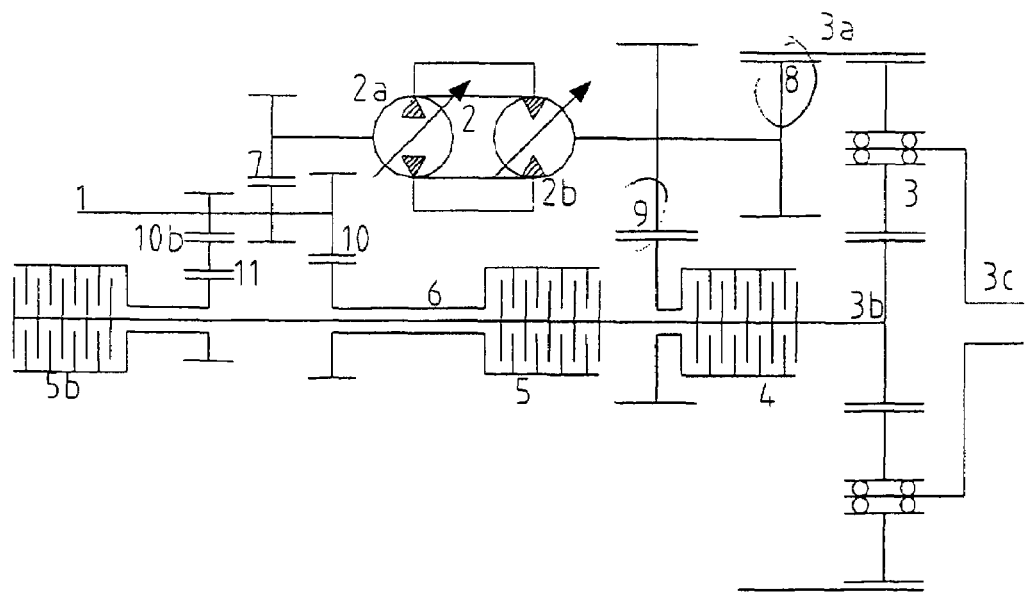
FIG. 2 is a schematic diagram of a second embodiment of a gearbox assembly with gearbox means for speed overlap.

With reference to FIG. 2, an additional coupling 5b with an associated gearbox stage 10b is introduced besides the gearbox stage 10 with the coupling 5 of the above-described embodiment. The gearbox stage 10b comprises an intermediate gear 11 to reverse the sense of rotation. These additional components of the gearbox assembly ensure that a second driving mode can also be provided by a corresponding drive of the control unit.

With reference to FIG. 3, unlike the initially mentioned exemplary embodiment of the present invention, only the gearbox stage 8 configured as a spur gear stage has a spur gear fixedly mounted on the shaft and driven by the hydrostatic gearbox 2. Said spur gear also runs in mesh with an externally geared ring gear 9a of the downstream gearbox stage 9 which, in this case, is a planetary gearbox. The coupling 4 serves to fix the planetary pinion 9c of the gearbox stage 9. The sun gears 3b and 9b of the gearbox stages 3 and 9, respectively, are arranged on a common shaft which can be fixed by the coupling 5. The planetary stage 3 downstream of the gearbox stage 9 is also driven by a common ring gear 9a and 3a. The power output of the planetary stage 3 is also via the planetary pinion 3c.

LIST OF REFERENCE NUMERALS 1 gearbox input shaft
2 hydrostatic gearbox
3 planetary stage
3a ring gear
3b sun gear
3c planetary pinion
4 first coupling
5 second coupling
6 shaft
7 gearbox stage
8 gearbox stage
9 gearbox stage
10 gearbox stage
11 intermediate gear

The invention claimed is:

1. A gearbox assembly, in particular for a wheel drive of a vehicle with a hydrostatic gearbox having at least one downstream planetary stage, wherein coupling the planetary stage to the hydrostatic gearbox is via intermediate gearbox means for speed overlap within the planetary stage, by having, according to a first driving mode, a sun gear of the planetary stage in effective interaction with a ring gear of the planetary stage via a first coupling, so that an output speed of the planetary stage is a linear function of an output speed of the hydrostatic gearbox and that, according to a second driving mode, the ring gear is in effective interaction with the hydrostatic gearbox, wherein, at the same time, the sun gear is in effective interaction with a gearbox input shaft via a second coupling so that as a consequence of power distribution, speeds of the ring gear and the sun gear overlap and in that the first coupling is in effective interaction with the ring gear of the planetary stage via a first gearbox stage, and in that the ring gear is in effective interaction with the hydrostatic gearbox via a second gearbox stage, wherein at least one of the first and second gearbox stages stage has a spur gear fixedly mounted on a shaft and the shaft is driven by the hydrostatic gearbox to connect the ring gear and the sun gear of the planetary stage with each other in the first driving mode, wherein the gearbox assembly outputs power via planetary pinion of the planetary stage, said planetary pinion meshing with the sun gear and the ring gear of the planetary stage.

2. The gearbox assembly according to claim 1, wherein each of the first and second gearbox stages has a spur gear fixedly mounted on a common shaft and in that the shaft is driven by the hydrostatic gearbox.

3. The gearbox assembly according to claim 1, wherein the hydrostatic gearbox comprises of a variable hydraulic pump which is hydrostatically coupled with a variable hydraulic motor.

4. The gearbox assembly according to claim 1, wherein switching between the first driving mode and the second driving mode is carried out by alternately operating the couplings via a central control unit which simultaneously also drives the hydrostatic gearbox according to the driver's wish.

5. The gearbox assembly according to claim 1, wherein the gearbox input shaft drives the hydrostatic gearbox via a third gearbox stage.

6. The gearbox assembly according to claim 1, wherein the second coupling is in effective interaction with the gearbox input shaft via a fourth gearbox stage.

7. The gearbox assembly according to claim 1, wherein at least one additional coupling is arranged between the gearbox input shaft and the sun gear of the planetary stage in order to make at least the second driving mode available for backward driving.

8. The gearbox assembly according to claim 7, wherein the additional coupling is in effective interaction with the gearbox input shaft via an associated gearbox stage with an intermediate gear for reversing rotation.

9. A gearbox assembly, in particular for a wheel drive of a vehicle with a hydrostatic gearbox having at least one downstream planetary stage, wherein coupling the planetary stage to the hydrostatic gearbox is via intermediate gearbox means for speed overlap within the planetary stage, by having, according to a first driving mode, a sun gear of the planetary stage in effective interaction with a ring gear of the planetary stage via a first coupling, so that an output speed of the planetary stage is a linear function of an output speed of the hydrostatic gearbox and that, according to a second driving mode, the ring gear is in effective interaction with the hydrostatic gearbox, wherein, at the same time, the sun gear is in effective interaction with a gearbox input shaft via a second coupling so that as a consequence of power distribution, speeds of the ring gear and the sun gear overlap and in that the first coupling is in effective interaction with the ring gear of the planetary stage via a first gearbox stage, wherein the gearbox assembly outputs power via planetary pinion of the planetary stage, said planetary pinion meshing with the sun gear and the ring gear of the planetary stage, wherein only the first gearbox stage has a spur gear fixedly mounted on a shaft and the shaft is driven by the hydrostatic gearbox, wherein said spur gear is in mesh with an externally geared ring gear of a downstream gearbox stage.

* * * * *